United States Patent [19]

McClary

[11] Patent Number: 5,666,483

[45] Date of Patent: Sep. 9, 1997

[54] REDUNDANT PROCESSING SYSTEM ARCHITECTURE

[75] Inventor: Charles R. McClary, Spring Lake Park, Minn.

[73] Assignee: Honeywell Inc., Minneapolis, Minn.

[21] Appl. No.: 532,949

[22] Filed: Sep. 22, 1995

[51] Int. Cl.$^6$ ................................................. G06F 11/00
[52] U.S. Cl. .............................. 395/182.08; 395/182.09; 701/4; 701/62; 701/200
[58] Field of Search ..................... 395/182.08, 182.09; 371/36; 364/424.013, 424.091, 443

[56] References Cited

U.S. PATENT DOCUMENTS

| | | | |
|---|---|---|---|
| 3,403,874 | 10/1968 | Boscovich | 371/36 X |
| 3,593,307 | 7/1971 | Gouge, Jr. et al. | 340/172.5 |
| 4,622,667 | 11/1986 | Yount | 395/182.09 |
| 5,193,175 | 3/1993 | Cutts, Jr. | 395/182.09 |
| 5,297,052 | 3/1994 | McIntyre | 364/453 |
| 5,339,404 | 8/1994 | Vandling, III | 371/36 X |
| 5,363,700 | 11/1994 | Joly | 73/504 |
| 5,515,282 | 5/1996 | Jackson | 371/36 X |

FOREIGN PATENT DOCUMENTS 0073602  3/1983  European Pat. Off. ......... G06F 11/18

OTHER PUBLICATIONS

K. Vanderwerf et al., "Fault Tolerant Inertial Navigation System", AIAA/IEEE 8th Digital Avionics Systems Conference, Oct. 17–20, 1988, pp. 821–829.

Chau et al., "Fault–Tolerance for Multistage Interconnection Networks," 1992 International Computing and Information Conference, pp. 430–435.

McClary et al., "Fault–Tolerant Air Data Inertial Reference System Development Results", 1994 IEEE Position Location and Navigation Conference, pp. 31–36.

M. Jeerage, "Reliability Analysis of Fault–Tolerant IMU Architectures With Redundant Inertial Sensors", IEEE Aerospace and Electronic Systems Magazine, vol. 5 No. 7, pp. 23–28.

H. Miller et al., "Fault Tolerant Integrated Inertial Navigation/Global Positioning Systems For Next Generation Spacecraft", 1991 Digital Avionics Systems Conference, pp. 207–212.

Smith et al, "Processor Architectures For Fault Tolerant Avionics Systems", 1991 Digital Avionics Systems Conference, pp. 214–219.

"A Fault–Tolerant Data/Inertial Reference System" by C. R. McClary, IEEE Aerospace & Electronic Systems, May 1992, vol. 7, #5, pp. 19–23.

Primary Examiner—Robert W. Beausoliel, Jr.
Assistant Examiner—Dieu-Minh Le
Attorney, Agent, or Firm—Albert K. Kau

[57] ABSTRACT

Disclosed is a fault-tolerant and/or fail-safe information processing system architecture for handling information from a plurality of independent subsystems which provide information related to selected input quantities, and which includes a plurality of redundant information processors for deriving specific processor output data as a function of the selected subsystem input quantities.

13 Claims, 4 Drawing Sheets

REDUNDANT PROCESSING SYSTEM ARCHITECTURE

BACKGROUND OF THE INVENTION

1. Field of the Invention

This invention generally relates to fault-tolerant and fail-safe information processing system architectures particularly useful for navigation and flight control. More specifically, the invention relates to information processing system architectures for handling information from a plurality of independent subsystems which provide information related to selected input quantities, and which the information processing system architecture includes a plurality of redundant information processors for deriving specific processor output data as a function of the selected subsystem input quantities.

2. Description of the Related Art

Fail-safe and fault-tolerant systems are frequently desired for aircraft navigation and flight control systems and other systems in which system performance error identification is critical. As is well known in the art, a fail-safe system is one in which a fault causes the system to shut down rather than continuing to function incorrectly, whereas a fault-tolerant system is one which has sufficient redundancy to remain functional even if a fault causes one part of the system to shut down. Fail-safe systems are generally used when fault tolerance is unnecessary, because a fail-safe system requires fewer components and is therefore less expensive. At the same time, fault-tolerant systems generally provide fail-safe capability when the redundancy factor is reduced below that which the output data provided by the redundant systems can no longer be cross checked or compared with other output data from other systems to validate the performance of the remaining redundant processing systems.

Fault-tolerant information processing system architectures known in the art may be unsynchronized (asynchronous processing systems), fully synchronized processing systems, and/or loosely synchronized processing systems.

For unsynchronized processing systems, redundant groups of subsystems for obtaining required information may be greater in number than necessary, and therefore may require a greater system cost. This is so since any subsystem fault in a single one group of subsystems may require the information of the one group of subsystems to be discarded. An example of this type of system is a group of inertial measuring units, where each inertial measuring unit requires three gyros and three accelerometers. A single accelerometer fault or gyro fault causes the information provided by the inertial measuring unit and corresponding information processor to be useless.

In a loosely synchronized processing system architecture, some form of a synchronous data frame processing system must be employed. This type of system may be incompatible with other types of processing architectures, and may also introduce a common link that may introduce failures into all of the groups of redundant subsystems. This is so, since such loosely synchronized processing system architectures, as well as synchronized processing system architectures, generally employ a common link in the form of a fault tolerant clock system. Although such systems may enhance reliability, they too are costly to implement.

Fault-tolerant and fail-safe information processing system architectures are of particular importance in navigation and flight control systems. Such systems are described in a publication entitled "A Fault Tolerant Data/Inertial Reference System", by Charles R. McClary, IEEE Aerospace & Electronic Systems Magazine, May 1992, Volume 7, #5, pages 19–23, and a publication entitled "Fault Tolerant Inertial Navigation System", by Kevin Vanderwerf and Knut Wefald, AIAA/IEEE Digital Avionics Systems Conference, 8th, San Jose, Calif., Oct. 17–20, 1988, pages 821–829. Both of these publications describe an inertial reference system which provides multiple processing systems for determining redundant inertial reference information including angular rotation and angular rotation rates, linear accelerations, attitude, velocity, and position.

Both of these aforesaid publications describe employment of a skewed axis redundant inertial reference system for data collection from a plurality of sensors, namely gyros and accelerometers, and subsequent processing by a plurality of redundant data processors. The skewed axis redundant inertial reference system generally employs six (6) gyros in which each gyro has an input axis which is skewed relative to all of the remaining gyros, and six (6) accelerometers in which each accelerometer has an input axis which is skewed relative to all of the remaining accelerometers. The processing system architecture for transferring the data collected by the subsystems associated with each of the sensors utilizes the principles of fault containment modular isolation as particularly taught in the aforesaid McClary publication, and also employs specific bit-by-bit voter techniques for validating the behavior of key fault containment modules or areas. However, these systems do not lend themselves to simplicity, and particularly to asynchronous operation.

SUMMARY OF THE INVENTION

An object of the present invention is to provide an information processing system architecture employing redundant processing.

Another object of the invention is to provide redundant processing in which the processing elements are decoupled from each other and permits asynchronous or synchronous operation of the transfer of subsystem information to the processing elements.

An object of the present invention is to provide a redundancy processing system architecture for inertial reference systems.

In the present invention a selected number of data processors are employed, where each data processor is independent of each other, and operative for deriving specific processor output data as a function of processor input data as provided by a plurality of subsystems. Each subsystem is intended to be independent of each other, and operative for determining selected subsystem information in response to a predetermined input quantity. Each subsystem is intended to include a set of subsystem data output means equal to the selected number of data processors. Each individual data output means of the set of subsystem data output means is intended to be independent and provide subsystem output data related to the subsystem input quantity intended to be observed. The subsystem output data from one of the data output means of each of the subsystems is presented to a unique one of the number of redundant data processors for deriving unique processor output data. In turn, the processor output data of each of the processors may be passed through a voter processor for reasonableness testing, or the like.

3

DESCRIPTION OF THE PREFERRED EMBODIMENT

Figure 1:
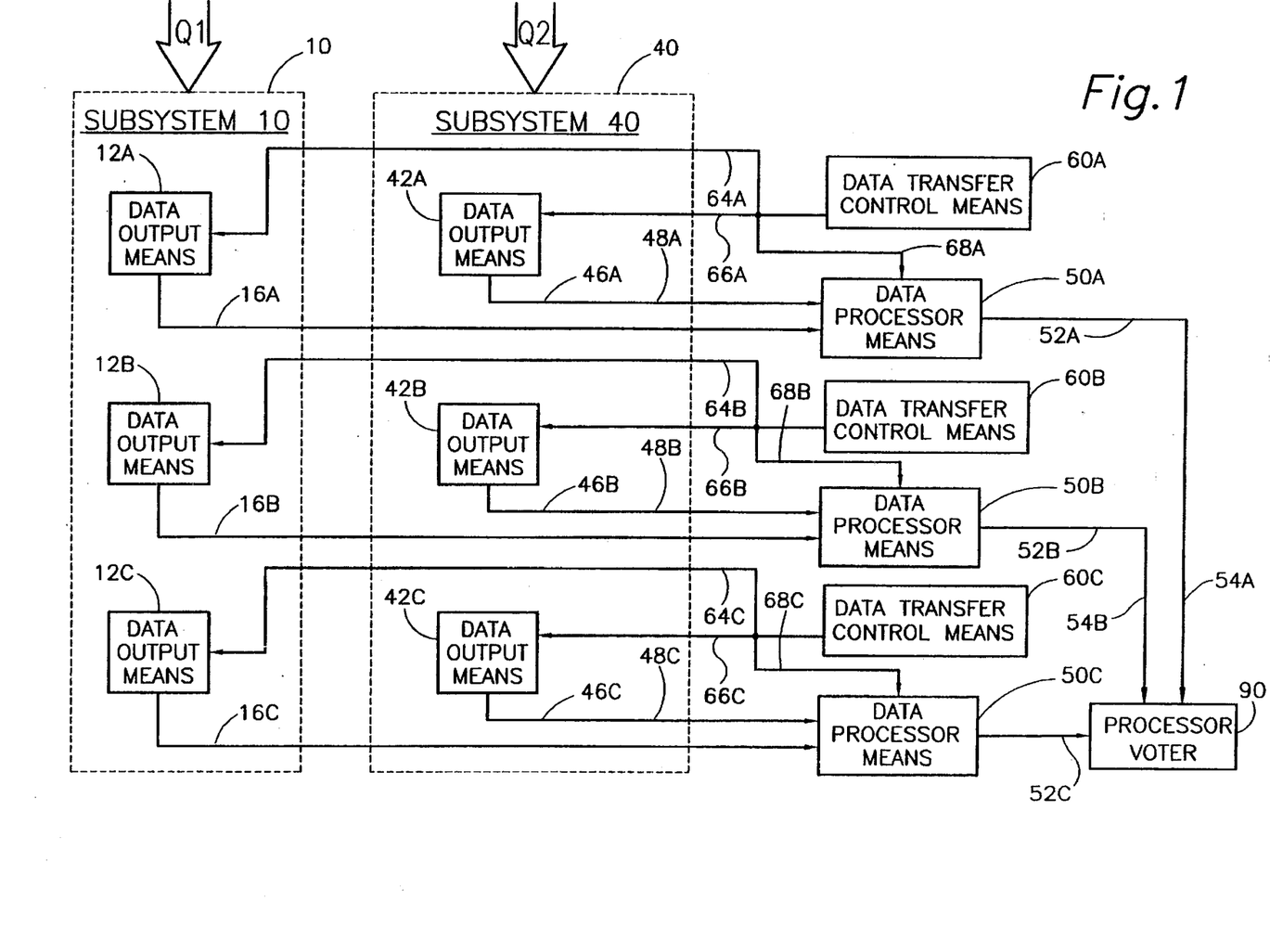
FIG. 1 is a block diagram depicting a redundant processing system architecture in accordance with the present invention.

FIG. 1 is a block diagram of a redundant processing system architecture in accordance with the present invention. Thereshown are two (2) independent subsystems 10 and 40 intended to provide input information to three substantially redundant data processor means 50A, 50B, and 50C. Each of the data processor means 50A-C are intended to be independent of each other, and operative for deriving specific processor output data as a function of independent processor input data provided by a plurality of subsystems, for example subsystems 10 and 40, as illustrated. In the preferred embodiment of the invention, each of the data processor means 50A-C are intended to be substantially identical and perform identical processing steps for deriving the same like-kind information as a function of the independent processor input data. Each data processor means is configured to provide the like-kind processor output information at a corresponding processor output means 52A-C of data processor means 50A-C, respectively.

Before proceeding, it should be noted that the alpha suffix designation to the numerical identifiers of the components of the processing system architecture refer to those associative components coupled to a specific one of the data processor means, namely 50A-C. Components having the same numerical identification, but different suffix, are intended to be substantially identical components except for their relationship to a specific data processor means, namely 50A-C.

For producing the like-kind processor output information, each of the data processor means 50A-C receives like-kind processor input data from the same subsystems, for example subsystems 10 and 40, although the data itself may differ in instantaneous value. Subsystem 10 is intended to be independent of subsystem 40, as well as subsystem 40 being independent of subsystem 10.

Subsystem 10 is intended to be responsive to at least one predetermined input quantity, for example Q1 as illustrated. For example, Q1 may be the observed angular rotation about a selected input axis. Subsystem 10 includes a set of subsystem data output means equal in number to the number of data processors of the redundant processing system architecture there illustrated. In the exemplary system illustrated in FIG. 1, three redundant data processor means are employed. Therefore, in accordance with the present invention, each subsystem 10 includes three (3) subsystem data output means 12A-C, i.e., equal in number to the number of data processor means 50A-C.

Similar to subsystem 10, subsystem 40 is also intended to be responsive to at least one predetermined input quantity, for example Q2 as illustrated. For example, Q2 may be the observed angular rotation about a different selected input axis than observed by subsystem 10 (or the same), or Q2 may be the observed acceleration along a selected input axis. Subsystem 40 also includes a set of subsystem data output means equal in number to the number of data processors of the redundant processing system architecture there illustrated. In the exemplary system illustrated in FIG. 1, subsystem 40 includes three (3) subsystem data output means 42A-C, i.e., equal in number to the number of data processor means 50A-C.

Each data output means 12A-C of the set of data output means associated with subsystem 10 are intended to be (i) independent of each other, and (ii) provide subsystem output data related to subsystem information of the corresponding subsystem, i.e. subsystem 10, as a function of or response to the input quantity Q1. Similarly, each data output means 42A-C of the set of data output means associated with subsystem 40 are intended to be (i) independent of each other, and (ii) provide subsystem output data related to subsystem information of the corresponding subsystem, i.e. subsystem 40, as a function of or response to the input quantity Q2.

Each of the aforesaid data output means are uniquely coupled to selected ones of the data processing means 50A-C for providing the subsystem output data associated with each data output means as processor input data for the selected data processor means. For subsystem 10, the set of data output means 12A-C are arranged such that data output means 12A is coupled to data processor means 50A through coupling means 16A; data output means 12B is coupled to data processor means 50B through coupling means 16B; data output means 12C is coupled to data processor means 50C through coupling means 16C. For subsystem 40, the set of data output means 42A-C are arranged such that data output means 42A is coupled to data processor means 50A through coupling means 46A; data output means 42B is coupled to data processor means 50B through coupling means 46B; data output means 42C is coupled to data processor means 50C through coupling means 46C.

With the coupling means arrangement as described above, data processor means 50A receives as processor input data the output data associated with both subsystems 10 and 40 provided by data output means 12A and 42A, respectively. Similarly, data processor means 50B receives as processor input data the output data associated with both subsystems 10 and 40 provided by data output means 12B and 42B, respectively; and data processor means 50C receives as processor input data the output data associated with both subsystems 10 and 40 provided by data output means 12C and 42C, respectively.

It should be understood that there is essentially no limit to the number of subsystems providing discrete output data as input data to each of the selected number of data processor means, hereshown as three in number. However, in accordance with the present invention, each subsystem must have a set of independent data output means equal in number to the number of data processing means providing redundancy.

For fault-tolerant and/or fail-safe systems, it should be understood by the reader that each of the data processing means 50A-C is intended to (i) receive the same like-kind processor input data from each of the subsystems, and (ii) independently perform the same data processing steps or functions. However, the data transfer from the data output means to the data processor means may be either asynchronous or synchronous. Secondly, for useful processor output data from each of the redundant data processing means 50A-C, the individual one data processing means should receive processor input data from each of the subsystems at a common sample time, "$T_n$," (where "n" represents a particular processor). For the redundancy processor function in accordance with the present invention, sample times $T_A$, $T_B$, and $T_C$ associated with each of the data processor means 50A-C, respectively, should be reasonably close together as will be subsequently described for an inertial reference system.

Accordingly, illustrated in FIG. 1 is a data transfer control means 60A coupled to (i) data output means 12A through coupling means 64A, (ii) data output means 42A through coupling means 66A, and (i ii) data processor means 50A through coupling means 68A. Similarly, data transfer control means 60B is coupled to (i) data output means 12B through coupling means 64B, (ii) data output means 42B through Coupling means 66B, and (iii) data processor means 50B through coupling means 68B; and data transfer control means 60C is coupled to (i) data output means 12C through coupling means 64C, (ii) data output means 42C through coupling means 66C, and (iii) data processor means 50C through coupling means 68C, Data transfer control means 60A–C serve to provide orderly transfer of subsystem output data provided by each data output means associated with each subsystem as processor input data for the associative one of the data processor means 50A–C. An implementation for data transfer and control means 60A–C is, of course, dependent upon the choice of data transfer technique between the corresponding data processor means and the data output means Coupled thereto. More specifically, whether the subsystem output data is intended to be serial or parallel data, and whether the data is transferred by electrical or optical signals determines the implementation of each of the data transfer means 60A–C. These choices and their ramifications in the construction detail of each transfer and control means 60A–C and each of the aforesaid coupling means, namely 16A–C, 64A–C, 66A–C, and 68A–C are, of course, well known in the art.

For explanation purposes, consider a serial data transfer of information, and that each data processor includes separate data storage means (not shown) for receiving the serial data; and that each of the data coupling means are separate serial data buses, i.e., one data bus associated with only one subsystem data means, as illustrated, and coupled to only one data processor means. In this scenario, considering only processor means 50A and data transfer control means 60A, data transfer control means 60A would issue a strobe signal at sample time $T_A$ on coupling means 64A and 66A starting the serial transfer of data on data bus to data processing means 50A, and at the same time sending a reset signal on coupling means 68A to clear the data storage memories of the data processor means 50A, and prepare such data storage means for new incoming data. Of course, this description is simplistic in nature for purposes of illustrating exemplary embodiments for data transfer.

In contrast, a separate common data bus may be employed with each data processor means having a single processor input means. In this case, the separate common data bus is coupled to the processor input means of only one processor, and be in common with one subsystem data output means of each subsystem, for example same as coupling means 16A, 46A, 64A, 66A, and 68A for providing addressable control and transfer of information from the subsystem data output means to the data processing means. However, like the serial case just above, it is still imperative that the data transferred correspond to a discrete sample time, i.e., $T_A$. Accordingly, each of the data means must embody some form of sample and hold components and addressable memory for transferring data from each of the subsystems to the unique one of the data processor means. Such implementation schemes being, of course, well known in the art.

It should be noted that in the arrangement in accordance with FIG. 1 and data transfer scenarios as just described, that each data processor means 50A–C and corresponding data output means may operate in an asynchronous mode. In an asynchronous mode, each data transfer and control means may operate independently of each other. Accordingly, the resultant processor output data would not be synchronized and would have differing values dependent upon the observed subsystem information and corresponding subsystem output data by the independent data output means at the independent sample times.

For process control applications, like navigation and flight control, the processor output data may be provided as inputs to a processor voter 90. If the differences between the sample times $T_A$, $T_B$ and $T_C$ is small, then processor voter 90 may apply a reasonable test to the processor output data provided by the data processor means 50A–C for fault detection and isolation of a system failure as is well understood in the art.

Figure 2:
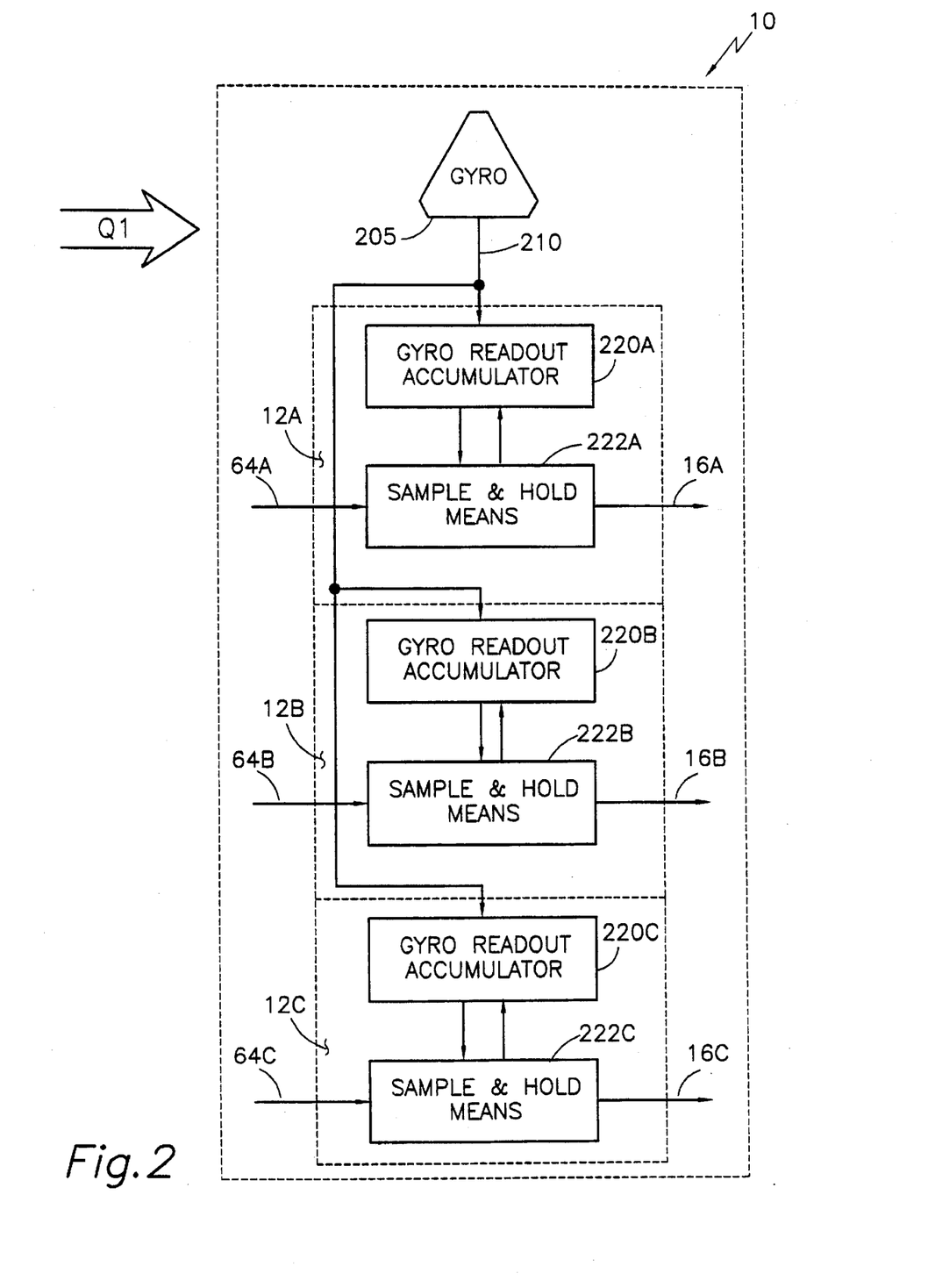
FIG. 2 is a block diagram describing a subsystem employing a gyro for measuring rotation about an input axis as an input quantity thereto.

Illustrated in FIG. 2 is an exemplary block diagram for subsystem 10, or any other subsystem. More specifically, FIG. 2 illustrates an embodiment of a gyro subsystem which may form, in part, an inertial reference system. Subsystem 10, as illustrated in FIG. 2, includes an angular rotation sensor depicted as a ring laser gyro 205. Gyro 205 is intended to sense the input quantity Q1 in the form of angular rotation about a selected input axis (not shown). As is well understood in the art of ring laser gyros, a ring laser gyro is an integrating rate gyro which provides as an output an interference pattern in which each dark band which passes a photo detector represents a discrete angular rotational change observed by the gyro 205 about the input axis. In turn, gyro 205 provides output signal changes on signal line 210 which may be accumulated in gyro read-out accumulator 220A which may be in the form of an up/down counter for counting the incremental angular rotation changes, including direction information in the form of directing these interference counts as being either up or down counts corresponding to either a clock wise or counter clock wise rotation direction about the gym input axis, respectively.

As illustrated in FIG. 2, data output means 12A is shown to include a sample and hold means 222A which includes means for receiving coupling means 64A to receive the strobe signal for capturing the data at the sample time $T_A$ of the gyro read out accumulator 220A, and hold such information in the sample and hold means 222A for subsequent transfer of this data to data processing means 50A through data coupling means 16A. In like manner, and constructed in a similar fashion, data output means 12B includes gyro readout accumulator 220B and sample and hold means 222B, and data output means 12C includes gym readout accumulator 222C and sample and hold means 222C.

As illustrated in the block diagram of FIG. 2, gyro readout accumulators 220A, 220B, and 220C of data Output means 12A, 12B, and 12C, respectively, are essentially "free running". That is, each of them are independently providing a gyro readout accumulator count in relation to the observed input quantity Q1, namely the rotation about the gyro 205 input axis. However, it should be recognized by those skilled in the art that if the gyro 205 and corresponding gyro readout accumulators 220A–C are functioning, then if each gyro accumulator is sampled at precisely the same time, the change in count of the gyro accumulators 220A–C between two sample times should be the same.

Similarly, if the gyro readout accumulators 220A–C are sampled at differing sample times substantially close to each other, and have substantially identical time intervals between successive sample times, then the change in the gyro readout accumulator and corresponding output of sample and hold means will also be substantially the samei.e., represent a common change in angular rotation between the two successive sample times. Thus, it is intended that in inertial reference system applications, data processing means 50A–C will each be operating on similar data corresponding to similar times, but uniquely independent from each other, to derive selected inertial reference information as aforesaid. If the redundant processing system is functioning properly, then the inertial reference information provided by each of the data processor means should be substantially identical within predefined error limits to validate the proper behavior of each of the data processor means and corresponding subsystems and components thereof. In turn, processor voter 90 may operate on the output data of each of the data processing means 50A–C for first determining that they are in proper limits, and secondly, may also operate on them for providing information averages before providing a final input to a navigation or flight control system.

In other words, if successive asynchronous sample times $T_A$, $T_B$, and $T_C$, are separated by substantially identical time intervals, the change in count value of each of the gyro readout accumulators will be substantially identical for a properly functioning system, even though the actual accumulator values are different due to differing sample times $T_A$, $T_B$, and $T_C$. If all subsystems operate in a similar manner, then the output information provided by each of the data processor means 50A–C will be substantially identical.

Figure 3:
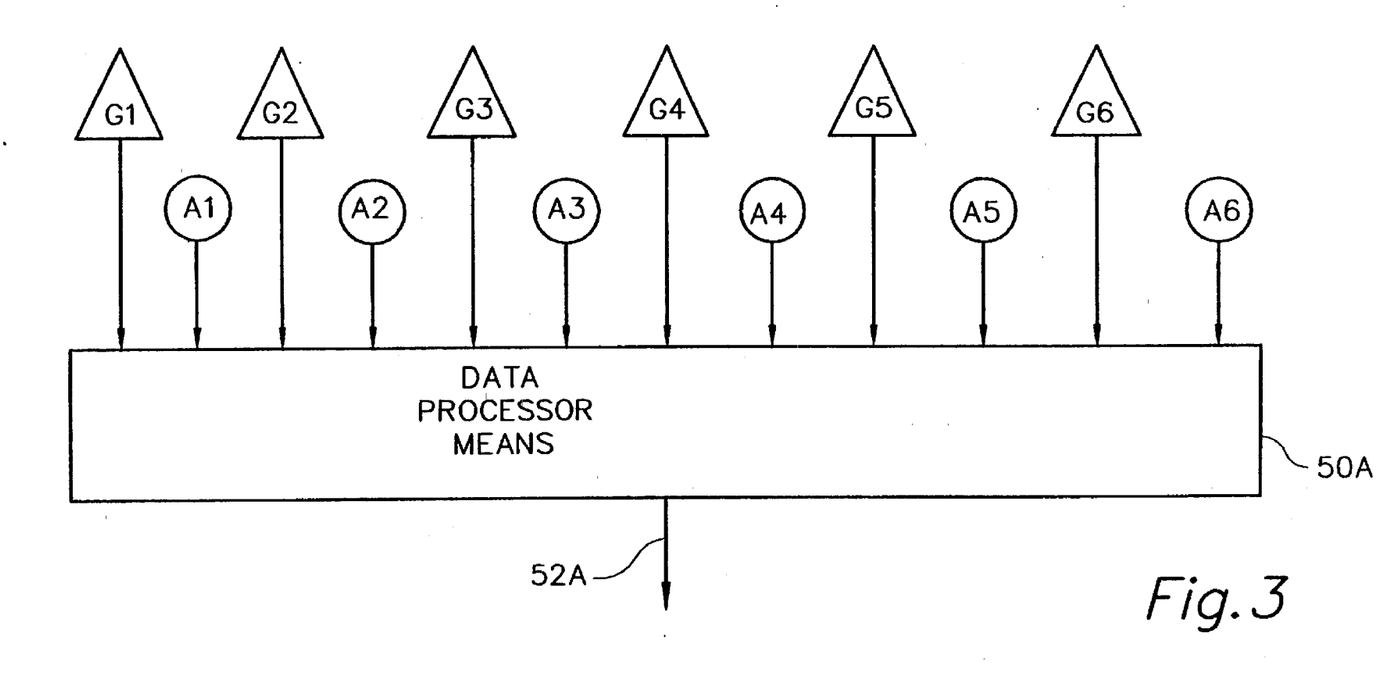
FIG. 3 is a block diagram depicting a set of subsystems for a fault tolerant inertial reference system.

FIG. 3 is a block diagram depicting a single data processor means 50A, in combination with a plurality of subsystems which form, in part, an inertial reference system like that described in the aforementioned publications. The block diagram illustrated in FIG. 3 depicts only those partial connections of the corresponding "A" data output means of each of the subsystems where the subsystems comprise six (6) gyros depicted by triangular blocks G1–6, and six (6) accelerometers depicted by circle blocks A1–A6. Thus, thereshown is a system in which there are twelve (12) subsystems-namely six (6) gyros and six (6) accelerometers, all providing input to data processor means 50A for providing data output at data output means 52A which is a function of all the outputs of the twelve (12) subsystems. In this exemplary embodiment, it should be apparent that for properly providing inertial reference output information by data processor means 50A, either the acceleration information or the rotation information provided by both the accelerometers and gyros, respectively, must correspond to concurrent sample times. This of course is the intended function of data transfer control means 60A, operating independently of the remaining ones of the data processor means 50B–C and corresponding data transfer control means 60B–C.

It should be understood that the redundant processing system architecture as illustrated in FIG. 1 is particularly applicable for achieving an asynchronous fault-tolerant and/ or fail-safe operation. This is so since each of the data output means of the set of data output means for each subsystem is independent of each other thereby providing free running information at sample times as determined by the time independent data transfer control means.

The system may also be operable as a synchronous system by modifying the construction of the subsystems. An exemplary subsystem 400 for synchronous operation is particularly illustrated in FIG. 4. Thereshown is the same gyro 205 providing an output on signal line 210 to a single gyro readout accumulator 420, similar to gyro readout accumulator 220 already described. Each data output means 412A–C now includes a single sample and hold means, 422A–C, respectively, coupled to the single gyro readout accumulator 420. In this situation, the sample and hold means 422A–C may be addressable by transfer and control means 60A–C through coupling means 64A–C, respectively, for providing data outputs on coupling means 16A, 16B, and 16C, respectively, all of which have been synchronized to a common clock (not shown) internal to subsystem 400 for sampling the gyro readout accumulator simultaneously. In operation, this system, of course, requires some form of a common clock interrupt to initiate all subsystem output data means corresponding to a common sample time.

Figure 4:
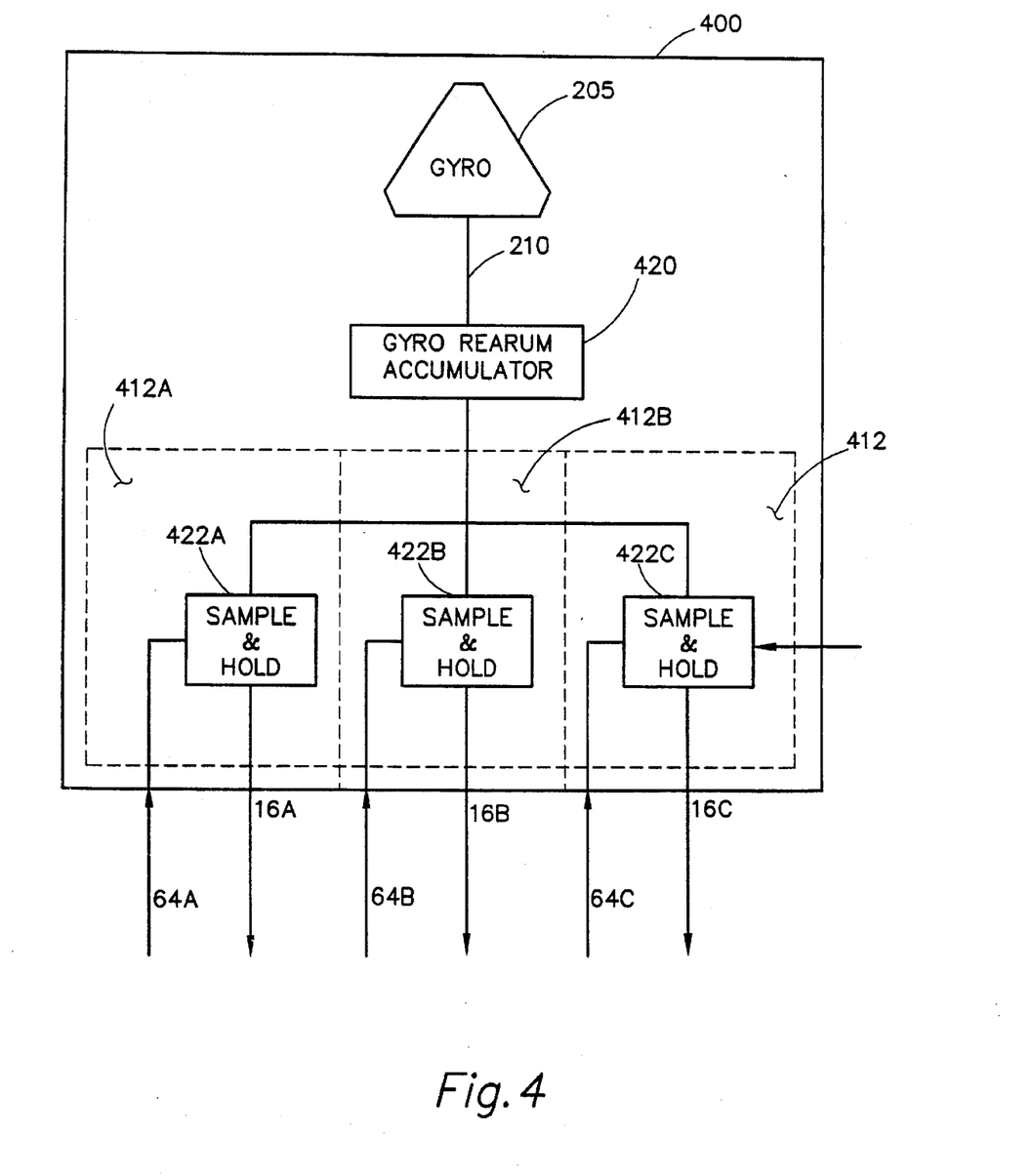
FIG. 4 is another embodiment of a subsystem employing a gym and illustrating synchronous storage of information.

Although the subsystem illustrated in FIG. 4 defeats the advantages of being asynchronous, it may be employed for reducing hardware costs and enhancing reliability of the transfer of data using the fault containment modular approach system since there exists independent data output means for each of the subsystems which are uniquely coupled to only one of the data processing means in a manner as described with reference to FIG. 1.

It should be recognized that the schematic block diagrams particularly illustrated in the figures may be configured by employment of many electronic subsystems, computers, and software/firmware implementations. The components identified as data output means, data processor means, coupling means and data transfer control means, may be implemented by a wide array of electrical and optical hardware which may be arranged and configured by a wide array of schemes, particularly dependent upon whether or not they are intended to be operate synchronously or asynchronously, all of which are intended to be within the true spirit and scope of the present invention.

More specifically, data processor means 50A–C may be embodied by a wide array of components such as microprocessors, and the like, intended for executing a number of instructions for manipulating the input data for obtaining the desired output information, e.g., inertial information, for subsequent employment by other process components or systems, e.g., navigation and flight control. Accordingly, data transfer control means may be embodied as part of the associative one of the data processor means including independent clock systems. Alternatively, the data transfer control means may also be embodied, external to the data processor means as illustrated, or some combination as desired.

It should be noted that the present invention is particularly directed to an asynchronous data process system architecture wherein the sampling frequency is sufficiently fast such that no synchronization of any kind is required between each of the data transfer and control means. However, if the sampling frequency is too slow, a periodic synchronization interrupt may be required so that each of the data processor means provides substantially the same processor output data periodically.

As indicated earlier, the redundant data processing system in accordance with the present invention may be operable with both electrical and optical coupling techniques for transferring serial or parallel data, all of which are intended to be within the true spirit and scope of the present invention.

The embodiments of an invention in which an exclusive property or right is claimed are defined as follows:

1. A data processing system architecture comprising:
   a selected number of data processor means, where each data processor means
   (i) is independent of each other,
   (ii) includes an input means for receiving processor input data, and
   (iii) is operative for deriving specific processor output data as a function of said processor input data;

a plurality of subsystems, where each subsystem
   (i) is independent of each other,
   (ii) is operative for determining subsystem information in response to at least one predetermined input quantity, and
   (iii) includes a set of subsystem data output means where the number of said subsystem data output means of the set is equal to said selected number of said plurality of data processor means, and where each subsystem data output means of said set of subsystem data output means (a) is independent of each other, and (b) provides subsystem output data related to said subsystem information associated with said set of subsystem data output means, and (c) provides subsystem output data which corresponds to a unique sample time; and data coupling means for selectively presenting said subsystem output data associated with said set of subsystem data output means of each of said plurality of subsystems to said plurality of data processor means such that (a) each data processor means uniquely receives said subsystem output data from one group of data output means, where said group of data output means consists of only a unique one of said subsystem data output means of the set of subsystem data output means of each one of said plurality of subsystems, and (b) each subsystem data output means of the group provides said subsystem data output to only one of said plurality of data processor means, and in which the subsystem output data of said group of subsystem data output means corresponds to a common sample time.

2. The data processing system architecture of claim 1 where in said data coupling means includes a plurality of data transfer and control means equal in number to said selected number of said plurality of data processor means, where each one of said plurality of said data transfer and control means
   (i) is independent of each other,
   (ii) is coupled to only one of said plurality of data processor means not coupled to any other data transfer and control means, and said subsystem data output means associated with one group of said subsystem data output means, and
   (iii) is operable for permitting the transfer of said subsystem output data associated With said group of subsystem data output means to said processor input means of said data processor means associated with said group of subsystem data output means.

3. The data processing system architecture of claim 1 wherein said data coupling means includes a separate data bus associated with each data processor input means and to only one of said group of subsystem data output means.

4. The data processing system architecture of claim 1 wherein said data coupling means includes a separate data bus associated with each subsystem data output means of each of said plurality of subsystems, and each separate data bus is coupled to said processor input means of only one of said plurality of data processor means and only one of said subsystem data output means.

5. The data processing system architecture of claim 1 wherein each of said data processor means is operative for determing identical output information in response to likekind subsystem information.

6. The data processing system architecture of claim 5 further comprising processor voter means responsive to said processor output data of each of said plurality of data processor means for detecting any faults in said data processing system architecture.

7. The data processing system architecture of claim 1 wherein said plurality of subsystems includes:
   six gyro subsystems, each having an angular rotation sensor associated therewith, and in which each gyro Subsystem is responsive to angular rotation along an axis different than any of the other remaining gyro subsystems; and
   six accelerometer subsystems, each having an acceleration sensor associated therewith, and in which each accelerometer subsystem is responsive to acceleration along an axis different than any of the other remaining accelerometer subsystems.

8. The data processing system architecture of claim 7 wherein each of said angular rotation sensors is a ring laser gyro.

9. The data processing system architecture of claim 8 wherein each of said gyro subsystems includes a plurality of gyro subsystem data output means equal in number to said selected number of data processor means, and in which each gyro subsystem data output means includes an accumulator which provides a representation of the change in angular rotation from one sample time to another sample time.

10. A data processing system architecture comprising:
at least first, second, and third data processor means, where each data processor means
   (i) is independent of each other,
   (ii) includes an input means for receiving processor input data, and
   (iii) is operative for deriving specific processor output data as a function of said processor input data;
a plurality of subsystems, where each subsystem
   (i) is independent of each other,
   (ii) is operative for determining subsystem information in response to at least one predetermined input quantity, and
   (iii) includes a set of first, second, and third subsystem data output means, and where each subsystem data output means of said set (a) is independent of each other, (b) provides subsystem output data related to said subsystem information associated with said set of said subsystem of subsystem data output means, and (c) provides subsystem output data which corresponds to a unique sample time; and a first data coupling means for coupling said first subsystem data output means associated with each of said plurality of subsystems to said input means of said first data processor means thereby providing said subsystem output data associated with said first subsystem data output means associated with each of said plurality of subsystems as processor input data for said first data processor means;

a second data coupling means for coupling said second subsystem data output means associated with each of said plurality of subsystems to said input means of said second data processor means thereby providing said subsystem output data associated with said second subsystem data output means associated with each of said plurality of subsystems as processor input data for said second data processor means;

a third data coupling means for coupling said third subsystem data output means associated with each of said plurality of subsystems to said input means of said third data processor means thereby providing said subsystem output data associated with said third subsystem data output means associated with each of said plurality of subsystems as processor input data for said third data processor means.

11. The data processing system architecture of claim 1 wherein:

said first data coupling means includes a first data transfer and control means coupled to said first data processor means and said first subsystem data output means of each set associated with each of said plurality of subsystems, and is operable for permitting the transfer of said subsystem output data from those ones of said first subsystem data output means to said first processor input means, and which said subsystem output data associated therewith corresponding to a first common sample time;

said second data coupling means includes a second data transfer and control means coupled to said second data processor means and said second subsystem data output means of each set associated with each of said plurality of subsystems, and is operable for permitting the transfer of said subsystem output data from those ones of said second subsystem data output means to said second processor input means, and which said subsystem output data associated therewith corresponding to a second common sample time; and said third data coupling means includes a third data transfer and control means coupled to said third data processor means and said third subsystem data output means of each set associated with each of said plurality of subsystems, and is operable for permitting the transfer of said subsystem output data from those ones of said third subsystem data output means to said third processor input means, and which said subsystem output data associated therewith corresponding to a third common sample time.

12. A data processing system architecture for a skewed axis redundant inertial reference system comprising:

a selected number of redundant data processor means, where each redundant data processor means
  (i) is independent of each other,
  (ii) includes an input means for receiving like-kind processor input data, and
  (iii) is operative for deriving inertial reference output data as a function of said like-kind processor input data;

at least six gyro subsystems, each having an angular rotation sensor associated therewith, and in which each gyro subsystem is responsive to angular rotation along a selected sensing axis which is skewed relative to the sensing axis of any of the other remaining gyro subsystems, and where each of said at least six gyro subsystems are
  (i) independent of each other, and
  (ii) includes a set of gyro subsystem data output means where the number of said gyro subsystem data output means of the set is equal to said selected number of said plurality of data processor means, and where each gyro subsystem data output means of said set of gyro subsystem data output means (a) is independent of each other, and (b) provides gyro subsystem output data corresponding to the sensed angular rotation about the sensing axis associated therewith, and (c) provides said gyro subsystem output data which corresponds to a unique sample time;

at least six accelerometer subsystems, each having an angular rotation sensor associated therewith, and in which each accelerometer subsystem is responsive to angular rotation along a selected sensing axis which is skewed relative to the sensing axis of any of the other remaining accelerometer subsystems, and where each of said at least six accelerometer subsystems are
  (i) independent of each other, and
  (ii) includes a set of accelerometer subsystem data output means where the number of said accelerometer subsystem data output means of the set is equal to said selected number of said plurality of data processor means, and where each accelerometer subsystem data output means of said set of accelerometer subsystem data output means (a) is independent of each other, and (b) provides accelerometer subsystem output data corresponding to the sensed angular rotation about the sensing axis associated therewith, and (c) provides said accelerometer subsystem output data which corresponds to a unique sample time; and data coupling means for selectively presenting (i) said gyro subsystem output data associated with said set of gyro subsystem data output means of each of said plurality of said at least six gyro subsystems to said plurality of data processor means, and (ii) said accelerometer subsystem output data associated with said set of accelerometer subsystem data output means of each of said plurality of said at least six accelerometer subsystems to said plurality of data processor means, such that (a) each data processor means uniquely receives said gyro subsystem output data and said accelerometer subsystem output data from one group of data output means, where said group of data output means consists of (i) only a unique one of said gyro subsystem data output means of the set of gyro subsystem data output means of each one of said plurality of gyro subsystems, and (ii) only a unique one of said accelerometer subsystems data output means of the set of accelerometer subsystem data output means of each one of said at least six accelerometer subsystems, and (c) each gyro subsystem data output means and accelerometer subsystem data output means of the group of data output means is presented as processor input data to only one of said plurality of data processor means, and in which the gyro subsystem output data of said group of said gyro subsystems data output means and the accelerometer subsystem output data of said group of accelerometer subsystem output data means corresponds to a common sample time.

13. The data processing system architecture of claim 12 further comprising processor voter means responsive to said inertial reference output data from each of said plurality of data processor means for detecting any faults in said data processing system architecture.

* * * * *